United States Patent [19]
Peterson

[11] Patent Number: 5,953,847
[45] Date of Patent: *Sep. 21, 1999

[54] FISHING ROD WITH INTEGRATED LINE GUIDES

[76] Inventor: Robert J. Peterson, 2800 S. Peterson Rd., Claremore, Okla. 74017

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,094

[22] Filed: May 23, 1996

[51] Int. Cl.⁶ ..................................................... A01K 87/00
[52] U.S. Cl. ................................................................. 43/24
[58] Field of Search ........................................ 43/18.1, 24

[56] References Cited

U.S. PATENT DOCUMENTS 1,475,408  11/1923  Reed .
2,351,734   6/1944  Backe ........................................... 43/18
2,538,306   1/1951  Fox et al. ..................................... 43/18
2,541,759   2/1951  Hamre .......................................... 43/18
2,610,427   9/1952  Caroland ...................................... 43/18
2,697,894  12/1954  Graham et al. .............................. 43/24
3,099,889   8/1963  Verneuil ....................................... 43/24
3,507,069   4/1970  Borba, Sr. .................................... 43/18
3,981,095   9/1976  Shepherd ...................................... 43/19
4,130,960  12/1978  Fontenot .................................... 43/18.1

FOREIGN PATENT DOCUMENTS 682096  11/1952  United Kingdom ..................... 43/18.1

*Primary Examiner*—David A. Scherbel
*Assistant Examiner*—Anthony Ojini
*Attorney, Agent, or Firm*—Head, Johnson & Kachigian

[57] ABSTRACT

A fishing rod in which the rod includes a plurality of spaced line guides, each formed from the rod itself into helical openings which are axial with the axis of the rod.

4 Claims, 2 Drawing Sheets

FISHING ROD WITH INTEGRATED LINE GUIDES

BACKGROUND OF THE INVENTION

This invention relates to fishing rods of which the art is replete of variety, types, sizes and materials. Such rods, in a variety of materials, sizes and flex, include a grip portion, a reel seat means to attach a reel and the rod portion per se that heretofore has included separately attached line guides which are typically wrapped to the rod at a variety of spacings along the length thereof.

SUMMARY OF THE INVENTION

It is a primary object of this invention to provide a fishing rod in which at least one line guide is formed from the rod itself and which guide provides suitable flexibility depending upon the rod length, the size and number of integrated line guides and their characteristics.

A further object of the invention is to provide line guides for fishing rods which are made up of helically wound portions of the rod itself which are formed axially to the rod, including the tip.

A further object of the invention is to provide a fishing rod in which the line guides are formed as helical spring-like coils and which act not only as guides for the fishing line but also provide the flexibility for the rod.

These and other objects and advantages of the invention will become apparent from the following description when taken in conjunction with the drawings forming a part of this specification.

DETAILED DESCRIPTION OF THE PREFERRED EMBODIMENT

Figure 1:
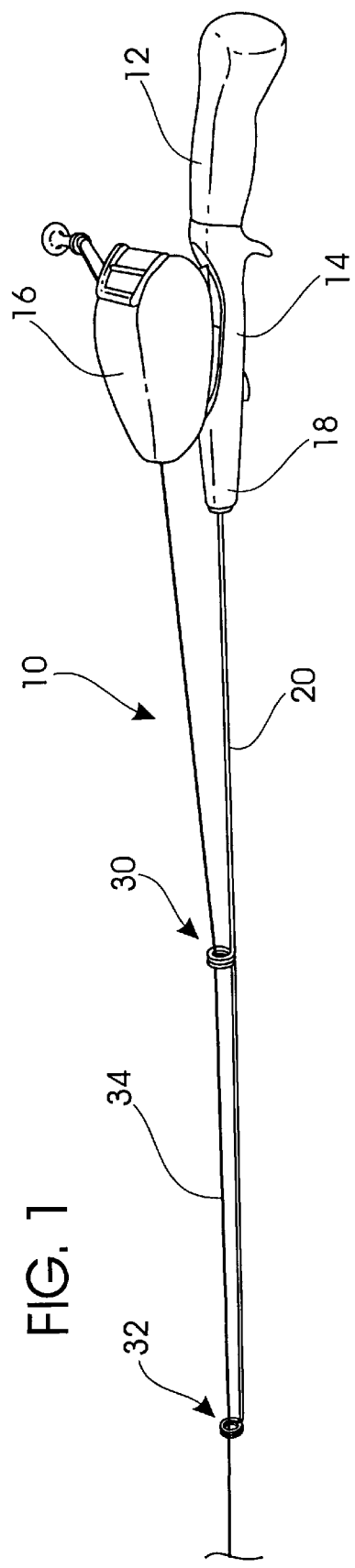
FIG. 1 is a perspective view of the fishing rod according to this invention.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

The fishing rod of this invention is shown in its entirety and is designated generally by the numeral 10. In this view, the rod is of a casting type having a handle or butt portion 12, a reel seat 14 and reel 16 retained within the seat in a well-known manner. The handle terminates with a forward socket portion 18 which retains the rod 20 as hereinafter described. The principal object of the invention is to provide line guides integrally formed as a part of the rod 20 including intermediate guide or guides generally designated by numeral 30 and a tip line guide generally designated by the numeral 32 through which fishing line 34 extends from the reel 16 through the line guides outwardly to a connected lure.

Figure 2:
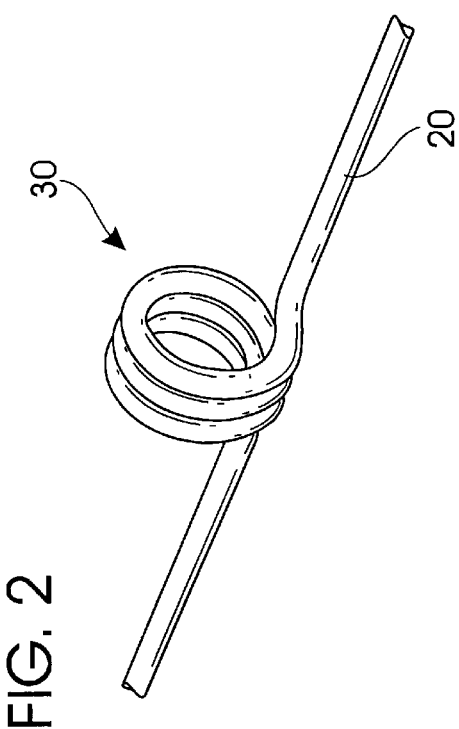
FIG. 2 is an enlarged perspective view of an intermediate line guide formed in accordance with this invention.
Figure 3:
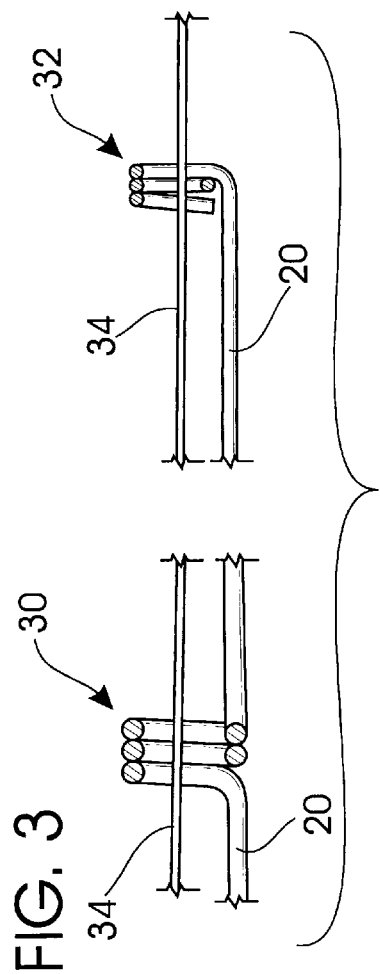
FIG. 3 is a partial elevational view, partly sectioned, depicting the rod with an intermediate line guide and tip guide formed in accordance with this invention.

As shown in FIGS. 2 and 3, each of the line guides are formed as a part of the rod in the form of coil springs having one or more coils. Not only do these coils, especially the intermediate coils, act as line guides but also will act as springs providing bending action to the rod. That is, the type of rod material and size and number of coils can provide a stiff, medium or flexible action to the rod.

Figure 4:
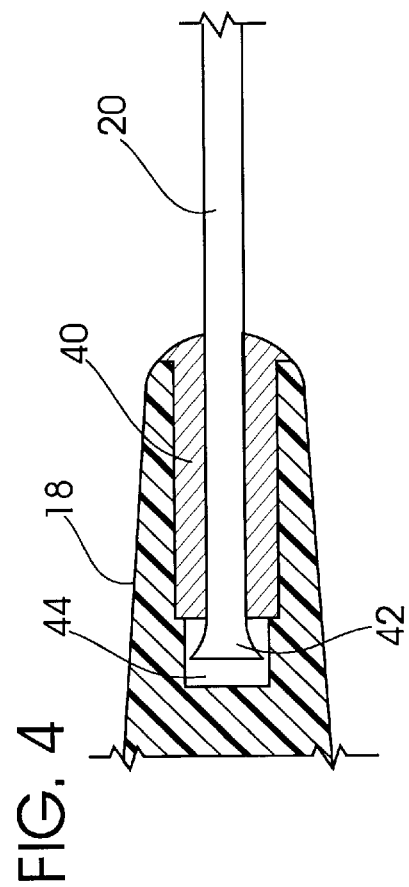
FIG. 4 is a partial sectional view depicting the assembly of the rod into the handle.
Figure 5:
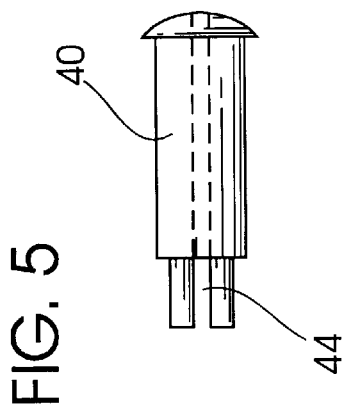
FIG. 5 is a top view of ferrule used to support the rod within the handle.

Referring now to FIG. 4, the ferrule and/or socket portion is depicted as assembled thereto. A pre-assembled ferrule 40 and rod 20 are inserted and glued within the forward socket portion 18. In such pre-assembly, the rod is flatted at its butt end 42 so as to be received crimped and locked to prevent rotation within the slot 44 formed as a part of the ferrule 40.

While other materials can be used, the rod of the invention may be made from a variety of metal and plastic materials including, but not limited to, spring steel, carbon steel, hot-rolled alloy steel, stainless spring materials and non-ferrous spring materials, reinforced plastics and composites, i.e. epoxies utilizing fiberglass, carbon fibers, glass, ceramic fibers, and the like.

Although a plurality of guides are shown, it is understood that a single guide, i.e., at the tip is inclusive of the invention.

What is claimed is:

1. A fishing rod comprised of a handle with means to support, on one side thereof, a fishing reel with line exiting therefrom to a lure, said handle provided with a forward socket to support a rod having a tip, said rod comprised of a first line guide intermediate said socket and said tip and substantially spaced from said forward socket, and a second line guide at said tip of said rod, each said first and second line guides being formed from said rod into a plurality of helical coils with openings that extend coaxially to and above an axis of said rod so as to be on the same said one side to receive said line axially from said reel through said first and second line guides to said connected lure, said first line guide formed as a helical spring-like coil, whereby that portion of said rod extending from said first line guide to said tip will be capable of substantial bending transversely to said axis of said rod, upon a load caused when a fish is caught by said lure.

2. The fishing rod of claim 1 wherein said rod includes a cylindrical bushing with an axial opening for said rod with means at an inner end to retain an end of said rod therein, said bushing and rod being retained in said recess of said handle.

3. The fishing rod of claim 1 wherein said rod is formed of metal.

4. The fishing rod of claim 1 wherein said rod is formed of a composite.

* * * * *